US012613012B2

(12) United States Patent
Fernández Ramírez et al.

(10) Patent No.: US 12,613,012 B2
(45) Date of Patent: Apr. 28, 2026

(54) DOUBLE-WALL TANK

(71) Applicant: Airbus Operations S.L.U., Getafe (ES)

(72) Inventors: Ana Fernández Ramírez, Getafe (ES); Jorge Ballestero Méndez, Getafe (ES); Pedro Nogueroles Viñes, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 0 days.

(21) Appl. No.: 18/772,623

(22) Filed: Jul. 15, 2024

(65) Prior Publication Data

US 2025/0027615 A1 Jan. 23, 2025

(30) Foreign Application Priority Data

Jul. 17, 2023 (EP) .................................... 23382731

(51) Int. Cl.
*F17C 13/08* (2006.01)

(52) U.S. Cl.
CPC .... *F17C 13/083* (2013.01); *F17C 2203/0629* (2013.01); *F17C 2205/0192* (2013.01); *F17C 2205/0196* (2013.01); *F17C 2270/0189* (2013.01)

(58) Field of Classification Search
CPC ............ F17C 13/083; F17C 2203/0629; F17C 2205/0192; F17C 2205/0196; F17C 2270/0189; F17C 2201/0109; F17C 2201/035; F17C 2201/054; F17C 2203/012; F17C 2203/014; F17C 2203/018; F17C 2203/0308; F17C 2203/0391; F17C 2203/0636; F17C 2203/0663; F17C 2209/221; F17C 2209/227; F17C 2209/228; F17C 2221/012; F17C 2223/0161; F17C 2223/033; F17C 2260/011; F17C 2260/016; F17C 2265/066; F17C 2270/0197; F17C 3/08; F17C 3/04; F17C 13/00; F17C 2201/0114; F17C 2203/011; F17C 2205/0302; B64D 37/30
See application file for complete search history.

(56) References Cited

U.S. PATENT DOCUMENTS

| | | | | |
|---|---|---|---|---|
| 797,577 A * | 8/1905 | Heylandt | .................. | F17C 3/08 220/560.1 |
| 2,858,136 A | 10/1958 | Harold | | |
| 2009/0032539 A1 | 2/2009 | Hobbs | | |
| 2014/0166662 A1 * | 6/2014 | Snyder | .................... | F17C 13/00 220/560.1 |

(Continued)

FOREIGN PATENT DOCUMENTS

| | | |
|---|---|---|
| AT | 501732 A4 | 11/2006 |
| JP | H0712295 A | 1/1995 |

OTHER PUBLICATIONS

European Search Report for corresponding European Patent Application No. 23382731 dated Dec. 4, 2023.

*Primary Examiner* — Shawn M Braden
(74) *Attorney, Agent, or Firm* — Greer, Burns & Crain, Ltd.

(57) ABSTRACT

A double-wall tank comprising an inner vessel surrounded by an outer jacket. The double-wall tanks comprising arrangements for coupling an inner vessel relative to an outer jacket which include roller bearings between the inner vessel and the outer jacket. Also an aircraft having at least one double-wall tank with the roller bearings.

14 Claims, 4 Drawing Sheets

(56) References Cited

U.S. PATENT DOCUMENTS

| | | | | |
|---|---|---|---|---|
| 2016/0123533 | A1* | 5/2016 | Milan ........................ | F17C 3/04 220/560.12 |
| 2023/0035247 | A1* | 2/2023 | Hernaiz Lopez ...... | B64D 37/02 |
| 2023/0159165 | A1 | 5/2023 | Vercamer et al. | |
| 2024/0151358 | A1* | 5/2024 | Minas ........................ | F17C 5/04 |

* cited by examiner

DOUBLE-WALL TANK

CROSS-REFERENCES TO RELATED APPLICATIONS

This application claims the benefit of European Patent Application Number 23382731.0 filed on Jul. 17, 2023, the entire disclosure of which is incorporated herein by way of reference.

FIELD OF THE INVENTION

The present invention belongs to the field of fluid storage systems. Particularly, it refers to a double-wall tank comprising an inner vessel surrounded by an outer jacket. More in particular, the invention relates to double-wall tanks comprising arrangements for coupling an inner vessel relative to an outer jacket.

BACKGROUND OF THE INVENTION

Due to environmental reasons, challenges to reduce the use of fossil fuels must be increasingly faced. In this scenario, green hydrogen produced on the basis of renewable energy is a reasonable candidate for efficient energy supply. Its high energy density makes it an emerging alternative fuel for aircraft applications.

In particular, hydrogen is an attractive fuel for high-altitude short-medium range aircraft because it contains about 3 times the energy per kilogram as compared with traditional hydrocarbon fuels. Therefore, in aircraft applications said high specific energy of hydrogen may be a key enabler. However, practical considerations have largely prevented its use. While the specific energy of hydrogen is very high, the energy per unit volume is comparatively low. Liquid hydrogen (LH2) enhances its energy density relative to gaseous form while allowing to reduce the mass of the tank required to confine the hydrogen within as a result of the lower pressure in liquid state. Liquid hydrogen at 20 K and 1 bar pressure has a density of 70 g/l compared to the 40 g/l of gaseous hydrogen at 88 K and 700 bar. Only cryo-compressed hydrogen has a higher density, with a value of 80 g/l at 38 K and 300 bar. According to these parameters, liquefied cryogenic form allows efficient storage at low pressure.

In this regard, LH2 cryotanks (i.e., tanks configured for housing liquid hydrogen and for maintaining the necessary conditions for maintaining hydrogen in the liquid state) are one of the key components of the structure of future generations of heavy lift launch vehicles, space exploration structures and new green aircrafts. It is in aircraft where the greatest challenges lie in developing hydrogen storage systems as a result of the need for reduced weight in combination with longest dormancy time requirements leading to good insulating and permeation properties. Some of the key challenges are geometry, temperature, pressure, permeation, thermal insulation, hydrogen embrittlement, vacuum tightness, system integration inside the tank and the tank integration in the aircraft structure.

Taking into account the aforementioned conditions, one of the main solutions used in the industry, especially in cases where fuel is stored under cryogenic conditions that require thermal insulation from the environment, as well as prevention of any potential leakage which could jeopardize operational safety, is the use of double-wall tanks. These double-wall tanks comprise an outer jacket and an inner pressure vessel coupled to each other using rigid elements as spacers such as struts or annular walls, attached by means of fixed connections to both the outer jacket and the inner vessel.

In this regard, one of the major challenges related to the design, production and operation of such double-wall tanks is the operational behavior under inertial loads arising from the in-service operation of the aircraft, as well as from the movement of the fluid stored inside the tank itself, which could lead to the failure of the attachment between the outer jacket and the inner vessel, and in turn to the loss of structural integrity leading to hydrogen leaks or loss of thermal insulation, and thus endangering the operational safety of the aircraft.

SUMMARY OF THE INVENTION

The present invention provides a double-wall tank according to one or more embodiments and an aircraft according to one or more embodiments.

In a first inventive aspect, the invention provides a double-wall tank comprising:

an inner vessel defining an inner chamber configured to house a fluid, an outer jacket defining an outer chamber which houses said inner vessel, and a union assembly provided between the inner vessel and the outer jacket;

wherein the inner vessel and the outer jacket extend along a longitudinal direction;

wherein the union assembly comprises a polar mount and at least three roller bearings; wherein the polar mount and the roller bearings are arranged between an exterior surface of the inner vessel and an interior surface of the outer jacket;

wherein the polar mount is arranged at a longitudinal end of the inner vessel according to the longitudinal direction, and wherein each roller bearing comprises a coupling portion and a rolling portion and is arranged:

with the coupling portion fixed to the exterior surface of the inner vessel and the rolling portion contacting the interior surface of the outer jacket, or with the coupling portion fixed to the interior surface of the outer jacket and the rolling portion contacting the exterior surface of the inner vessel.

The double-wall tank according to the present invention comprises an inner vessel and an outer jacket. The inner vessel defines an inner chamber configured to house a fluid, such as fuel, preferably liquid hydrogen. The outer jacket defines an outer chamber which houses the inner vessel. Both the inner vessel and the outer jacket extend along a longitudinal direction, such that two respective longitudinal ends according to the longitudinal direction can be defined for each of the inner vessel and the outer jacket. Both the inner vessel and the outer jacket comprise an interior surface and an exterior surface, such that the interior surface of the outer jacket faces the exterior surface of the inner vessel.

The present invention provides a solution for the integration between the inner vessel and the outer jacket of the double-wall tank. Advantageously, the union assembly improves the dynamic behavior of the double-wall tank, providing an even distribution of loads, thus minimizing stress concentrations. In this regard, the union assembly allows the double-wall tank to withstand dynamic loads in an efficient way when the double-wall tank is subjected to acceleration forces, which otherwise could lead to the failure of the attachment points between the inner vessel and the outer jacket (especially in the case of using rigid elements attached by means of fixed connections to both the outer jacket and the inner vessel), and in turn to the loss of structural integrity, leading to fluid leaks or loss of thermal insulation, and thus endangering the operational safety. For example, when the double-wall tank is mounted in an aircraft, the loads that the double-wall tank and, more in particular, the inner vessel has to withstand, are due to take-off, accelerations, turbulence and landing of the aircraft.

In this regard, sloshing is a known undesirable phenomenon that affects fluids stored within a container or tank and which is caused by the jostling to which the container may be subjected, especially if the container is mounted on a vehicle. As a result of this jostling, forces are exerted on the liquid propellant, tending to cause a non-uniform fluid flow along a longitudinal extent of the container wall and associated non-uniform distribution of the fluid across the width of the container.

The sloshing motion of the fluid can induce significant structural loads and rigid body disturbances which may affect control system operation.

Additionally, the thermal effects on the double-wall tank have an impact on the relative displacement between the outer jacket and the inner vessel, mainly along the longitudinal direction, and, therefore, on the dynamic behavior and load distribution of said double-wall tank. In this sense, the different temperatures of the outer jacket and the inner vessel, for example when the latter stores in its interior a fluid under cryogenic conditions, produce different deformations of both elements, i.e. thermal expansions/contractions. These different deformations of the outer jacket and the inner vessel result in said relative displacement between both elements.

Advantageously, the presence of the union assembly installed within the inner volume between the outer jacket and the inner vessel, allows relative displacement as well as helps to transfer the structural loads originated between them.

In this regard, the union assembly allows the double-wall tank to withstand dynamic loads in an efficient way when the double-wall tank is subjected to acceleration forces.

For this purpose, the union assembly comprises a polar mount arranged between a longitudinal end of the inner vessel and the corresponding longitudinal end of the outer jacket according to the longitudinal direction, such that the inner vessel and the outer jacket are maintained separated at a predetermined distance. Said polar mount acts as a support to withstand loads and moments in any direction at the longitudinal end of the double-wall tank to which it is coupled. By virtue of the coupling provided by the polar mount between the corresponding longitudinal ends of the inner vessel and of the outer jacket, which maintains both ends at a constant separation distance, longitudinal relative deformation of the inner vessel and the outer jacket along the longitudinal direction only takes place between the opposite longitudinal ends of the inner vessel and the outer jacket.

The union assembly further comprises at least three roller bearings arranged between an exterior surface of the inner vessel and an interior surface of the outer jacket.

A roller bearing is an element that is used to provide low-friction movement for a bushing or bearing block through a contact surface. Said contact surface of the roller bearing, due to the condition of rolling motion that is established between said roller bearing and the surface on which it rolls, has a smaller dimension than the overall dimension of the roller bearing. Heat-transfer is also minimized by virtue of said relation of dimensions, which permits a limited amount of heat to be transferred by conduction. Each of the roller bearings comprises a coupling portion and a rolling portion, and is arranged to withstand radial loads. In particular, each roller bearing is arranged with the coupling portion fixed to the exterior surface of the inner vessel and the rolling portion contacting the interior surface of the outer jacket, or with the coupling portion fixed to the interior surface of the outer jacket and the rolling portion contacting the exterior surface of the inner vessel.

The roller bearings support loads experienced by the double-wall tank while minimizing friction and heat transfer through the rolling portion of the roller bearing, between an exterior surface of the inner vessel and an interior surface of the outer jacket. Additionally, the roller bearings are resilient enough so as to be capable of absorbing relatively small displacements in radial directions between the inner vessel and the outer jacket (that is, in a direction perpendicular to the longitudinal direction) while allowing significantly higher displacements along the longitudinal direction by virtue of its rolling capabilities.

The union assembly maintains the separation between the inner vessel and the outer jacket of the double-wall tank while contributing to minimize the heat transfer path between them by employing discrete support elements (e.g., the roller bearings), which generally provide less heat conduction area than continuous support elements such as walls.

In an embodiment, the coupling portion of at least one roller bearing is fixed to the exterior surface of the inner vessel and the rolling portion contacts the interior surface of the outer jacket.

In an embodiment, the coupling portion of at least one roller bearing is fixed to the interior surface of the outer jacket and the rolling portion contacts the exterior surface of the inner vessel.

In an embodiment, at least a roller bearing is a roller ball bearing, wherein the rolling portion is a ball. In a particular embodiment, all the roller bearings are roller ball bearings, wherein the rolling portion is a ball.

Advantageously, a roller ball bearing provides a low-friction contact surface which allows relative movement between the inner vessel and the outer jacket through the point of contact between the ball and the corresponding surface which the ball contacts.

In an embodiment, the double-wall tank comprises a fluid channeling system configured for conducting fluid to/from inside the double-wall tank, the fluid channeling system being arranged at one longitudinal end of the double-wall tank and comprising at least one pipe accessing the inner chamber crossing through the outer jacket and the inner vessel. The at least one pipe crosses the inner vessel and the outer jacket through each corresponding longitudinal end. According to this embodiment, the polar mount is arranged between the longitudinal ends of the inner vessel and the outer jacket through which the at least one pipe crosses the inner vessel and the outer jacket. Advantageously, the relative displacements between the inner vessel and the outer jacket due to different thermal expansions are reduced. More in particular, by virtue of the coupling provided by the polar mount between the corresponding longitudinal ends of the inner vessel and of the outer jacket, which maintains both ends at a constant separation distance, longitudinal deformations at the connecting interface between the fluid channeling system and the double-wall tank are prevented, longitudinal relative deformation of the inner vessel and the outer jacket along the longitudinal direction only taking place at the longitudinal ends opposite to said connecting interface.

In an embodiment, the coupling portion of the roller bearings comprises GFRP ("Glass Fiber Reinforced Polymer") or CFRP ("Carbon Fiber Reinforced Polymer").

In an embodiment, the rolling portion of the roller bearings comprises an elastomer. Advantageously, the rolling portion is less prone to harm or jeopardize any surface with which the rolling portion is in contact.

In an embodiment, the inner volume between the outer jacket and the inner vessel is kept under vacuum conditions.

The inner vessel, in the case of containing a cryo-compressed fluid, such as hydrogen, will be exposed to extremely low temperatures. Advantageously, maintaining vacuum conditions in the inner volume provides thermal insulation between the inner vessel and the outer jacket, nearly eliminating the conduction and convection heat transfer.

In a particular embodiment, the inner volume between the inner vessel and the outer jacket is under ultra-high vacuum (UHV) conditions. According to this vacuum regime, operating pressure is lower than about 100 nanopascals ($1.0\times10^{-7}$ Pa; $1.0\times10^{-9}$ mbar; $7.5\times10^{-10}$ Torr).

In an embodiment, each of the outer jacket and the inner vessel comprise a central portion extending along the longitudinal direction.

In an embodiment, the central portion of the outer jacket is either substantially cylindrical or substantially frustoconical.

In an embodiment, the central portion of the inner vessel is either substantially cylindrical or substantially frustoconical.

In an embodiment, one or more of the roller bearings is arranged between the central portion of the outer jacket and the central portion of the inner vessel.

In an embodiment, all the roller bearings are arranged between the central portions of the outer jacket and the inner vessel.

In an embodiment, the outer jacket and the inner vessel have the same shape, the outer jacket having a larger size and housing the inner vessel. According to an embodiment, the exterior surface of the inner vessel and the interior surface of the outer jacket are arranged parallel to each other, i.e., uniformly separated from each other at all points. In this embodiment, the roller bearings are arranged between both the interior surface of the outer jacket and the exterior surface of the inner vessel maintaining such uniform separation between them in a situation of rest, and contributing to damping relative displacements between them, i.e., displacements in a radial direction or in a direction perpendicular to the longitudinal direction.

In an embodiment, the roller bearings arranged between the central portions of the outer jacket and the inner vessel are spaced from each contiguous roller bearing by an arc of substantially 360/n degrees according to a circumferential direction about the longitudinal direction, with n being the number of roller bearings arranged between the central portions of the outer jacket and the inner vessel. In other words, the projections of the locations of the roller bearings on a plane perpendicular to the longitudinal direction along which the inner vessel and outer jacket, and the corresponding central portions, extend, are uniformly spaced. According to this embodiment, the roller bearings are evenly spaced around the circumference of the inner vessel.

In an embodiment, the roller bearings are placed at locations closer to the longitudinal end of the inner vessel opposite to the longitudinal end where the polar mount is arranged than to said longitudinal end where the polar mount is arranged. This distribution of the roller bearings allows improved balance of the loads and thus dynamic behavior during operation.

In an embodiment, the roller bearings are placed at locations arranged, with respect to the polar mount, at a distance of at least 75% of the maximum length of the double-walled tank along the longitudinal direction.

The number of roller bearings is related to the size and weight of the double-wall tank, which determine the level of loads to be supported and transferred by the roller bearings. The number of roller bearings also depends on the thermal characteristics expected to be experienced during operation, as well as on the insulating properties of the roller bearings.

In an embodiment, the number of roller bearings is greater than or equal to 3.

In an embodiment, the number of roller bearings is between 3 and 20.

In an embodiment, the number of roller bearings is between 3 and 10.

In an embodiment, the number of roller bearings is between 3 and 6. Advantageously, a number of roller bearings between 3 and 6 allows relative displacement as well as helps to transfer the structural loads originated between the inner vessel and the outer jacket and limits the weight increase associated with a higher number of roller bearings as well as the heat transfer between the inner vessel and the outer jacket due to the presence of such roller bearings.

Based on the above-mentioned design factors, three embodiments with a different number of bearings are described below.

In an embodiment, the number of roller bearings present in the double-wall tank is 3. In an embodiment, the roller bearings are arranged such that the projections of their locations on a plane perpendicular to the longitudinal direction are substantially (+/−10%) uniformly spaced, i.e. with a spacing of substantially 120 degrees between contiguous projections according to the circumferential direction.

In an embodiment, the number of roller bearings present in the double-wall tank is 4. In an embodiment, the roller bearings are arranged such that the projections of their locations on a plane perpendicular to the longitudinal direction are substantially uniformly spaced, i.e. with a spacing of substantially 90 degrees between contiguous projections according to the circumferential direction.

This embodiment presents an improved performance from a dynamic behavior point of view, as the greater degree of symmetrical distribution of the bearings around the longitudinal direction of the tank offers a better response to the inertial loads experienced during operation. In particular, the configuration according to this embodiment is also symmetrical with respect to any of the bisector planes defined between two different roller bearings, providing greater stability of the connection between the inner vessel and the outer jacket under dynamic loads in any direction.

In an embodiment, the number of roller bearings present in the double-wall tank is 10. In an embodiment, the roller bearings are arranged such that the projections of their locations on a plane perpendicular to the longitudinal axis are substantially uniformly spaced, i.e. with a spacing of substantially 36 degrees.

This embodiment presents an improved performance from a dynamic behavior point of view, especially for embodiments of larger and heavier double-wall tanks, and/or wherein the expected loads experienced during operations are higher.

In an embodiment, the double-wall tank comprises at least one housing provided in the exterior surface of the inner vessel and/or the interior surface of the outer jacket, and wherein:

the coupling portion of one of the roller bearings is fixed in the housing; and/or the rolling portion of one of the roller bearings is arranged in the housing.

Embedding a roller bearing within such housing contributes to preventing axial and circumferential displacement of the roller bearing.

According to embodiments of the invention, the housing is provided during the manufacturing process of the corresponding inner vessel or outer jacket, for example by means of a co-curing, bonding or welding process for cases involving thermoplastic-made components, or a co-bonding process for CFRP thermoset-made components.

According to particular embodiments, the housing is made of a thermoplastic material and is welded to at least one thermoplastic portion or laminate provided at the corresponding portion of the inner vessel or the outer jacket.

In an embodiment where the rolling portion of a roller bearing is arranged in a housing, the housing receives the roller bearing and may limit its movement. In particular, when the rolling portion of the roller bearing is arranged in the housing, the sliding of the rolling portion is limited by the size of the housing. In this regard, the housing may be a perimetral groove provided on the interior surface of the outer jacket where the roller bearings are positioned.

In an embodiment, the number of housings equals the number of roller bearings and, for each roller bearing, the coupling portion is fixed in the housing or the rolling portion is arranged in a housing.

In an embodiment, the double-wall tank comprises a damping means arranged to absorb displacements of one of the roller bearings in a direction perpendicular to the surface to which the bearing is fixed.

In an embodiment, the double-wall tank comprises a plurality of damping means, each arranged to absorb displacements of a roller bearing in a direction perpendicular to the surface to which said roller bearing is fixed. More particularly, the damping means are arranged to dampen displacement of the roller bearing along a radial direction.

Advantageously, by virtue of the implementation of said damping means, radial perturbations caused by different sources such as pressure (e.g., the difference between the exterior of the double-wall tank and the inner volume between the inner vessel and the outer jacket, especially when it is subjected to vacuum conditions), temperature differences, inertial loads, landing loads, etc. can be absorbed.

In an embodiment, the damping means comprise a spring.

In an embodiment, at least one damping means is implemented as part of the coupling portion of at least one roller bearing.

In an embodiment where the coupling portion of a roller bearing is fixed in a housing, the damping means is fixed between the housing and the coupling portion of the roller bearing.

In an embodiment, the exterior surface of the inner vessel and/or the interior surface of the outer jacket comprises a structural reinforcement provided in:

at least one region to which the coupling portion of a roller bearing is fixed, and/or at least one region on which the rolling portion of a roller bearing contacts.

The structural reinforcement used in this embodiment is intended to reinforce the regions of the inner vessel and/or the outer jacket where the roller bearings are located.

In an embodiment, the structural reinforcements are provided either:

on the exterior surface of the inner vessel, in the portion of the inner vessel at which the rolling portion of the roller bearing contacts with the inner vessel, so as to protect and/or reinforce this region at which the rolling portion of the roller bearing may roll, on the interior surface of the outer jacket, between the coupling portion of the roller bearing and the region of the interior surface of the outer jacket to which the roller bearing is fixed, or both.

In an embodiment, the structural reinforcements are provided either:

on the interior surface of the outer jacket, in the portion of the outer jacket at which the rolling portion of the roller bearing contacts with the outer jacket, so as to protect and/or reinforce this region at which the rolling portion of the roller bearing may roll, on the exterior surface of the inner vessel, between the coupling portion of the roller bearing and the region of the exterior surface of the inner vessel to which the roller bearing is fixed, or both.

Therefore, the provision of said structural reinforcement strengthens the critical regions of the inner vessel and/or the outer jacket in contact with the roller bearings, improving the safety and durability of the double-wall tank.

In an embodiment, at least one structural reinforcement comprises a thermally insulating material.

Advantageously, in this embodiment heat transfer from the outer jacket to the inner vessel through the roller bearing is reduced.

In an embodiment, at least one structural reinforcement comprises GFRP ("Glass Fiber Reinforced Polymer").

In an embodiment, at least one structural reinforcement is coated with a thermal barrier coating (TBC) material.

In an embodiment, the outer jacket comprises at least one dome-shaped portion provided in at least one longitudinal end thereof.

In an embodiment, the inner vessel comprises at least one dome-shaped portion provided in at least one longitudinal end thereof.

From an architectural and geometric perspective, a dome-shaped structure, in the sense of the present invention, may be understood as any portion of a sphere resulting from being cut by a plane. It may also have slightly different concave-convex shapes such as for example a paraboloid shape.

In an embodiment, the outer jacket comprises a first flange extending outwardly from the exterior surface of the outer jacket.

Advantageously, the first flange acts as a stiffener facilitating the transfer of loads between the inner vessel and the outer jacket through the roller bearings.

In an embodiment, the first flange comprises a thickness extending according to the longitudinal direction along a portion of the outer jacket, and at least one roller bearing is arranged between said portion of the outer jacket and the exterior surface of the inner vessel.

In an embodiment, the first flange extends along at least a portion of the perimeter of a cross-section of the outer jacket according to a plane perpendicular to the longitudinal direction.

In an embodiment, the first flange extends along the entire perimeter of a cross-section of the outer jacket according to a plane perpendicular to the longitudinal direction.

In an embodiment, the first flange results from the union of two parts attached to each other to form the outer jacket, each part comprising a flange portion that is abutted and attached to the corresponding flange portion of the other part. In an embodiment, one of the parts forms the dome-shaped end-portion of the outer jacket while the other part forms a cylindrical portion of the outer jacket.

In an embodiment, a dome-shaped portion provided at one longitudinal end of the outer jacket extends from the central portion of said outer jacket, and the first flange is arranged on the central portion and adjacent to the dome-shaped portion.

In an embodiment, the outer jacket comprises a reinforced portion adjacent to the first flange, and at least one roller bearing is arranged between said reinforced portion of the outer jacket and the exterior surface of the inner vessel.

The reinforced portion is provided with a reinforcing feature. In an embodiment, the reinforcing feature is an increase of the thickness of the outer jacket and/or a reinforcing material provided during the manufacturing process of the reinforced portion of the outer jacket.

In an embodiment, the outer jacket comprises a second flange extending outwardly from the exterior surface, the second flange is arranged on the dome-shaped portion and adjacent to the first flange, and the second flange is fixed to the first flange.

On one side, the second flange provided on the edge of the dome-shaped portion contributes to a more efficient assembling process of the double-wall tank, allowing the coupling of the dome-shaped portion and the central portion by fixing the second flange and the first flange.

In this regard, the attachment between said second flange of the dome-shaped portion and the first flange of the central portion allows to carry out the curing of the dome-shaped portion and the central portion simultaneously in case that pre-cured composite components for the dome-shaped portion and the central portion are provided.

On the other side, the second flange further strengthens the area adjacent to the region of the exterior surface to which the coupling portion of a roller bearing is fixed, acting as a stiffener in order to facilitate the transfer of loads between the inner vessel and the outer jacket through the roller bearing.

In an embodiment, the second flange is fixed to the first flange by means of a bolted or riveted connection.

In an embodiment, the second flange is fixed to the first flange by means of a staggered bolted connection.

In an embodiment, the second flange is fixed to the first flange by means of a band clamp.

In an embodiment, the joint interface between the first flange and the second flange comprises sealing means.

In an embodiment, the sealing means comprise at least one selected from a sealant, an O-ring and a gasket, preferably a cryogenic gasket.

In an embodiment, the second flange extends along at least a portion of the perimeter of a cross-section of the dome-shaped portion according to a plane perpendicular to the longitudinal direction.

In an embodiment, the second flange extends along the entire perimeter of a cross-section of the dome-shaped portion according to a plane perpendicular to the longitudinal direction.

In an embodiment, all the roller bearings are located substantially in the same plane perpendicular to the longitudinal direction.

In an embodiment, at least one of the roller bearings is located in a plane perpendicular to the longitudinal direction different from the plane in which another roller bearing is located.

In an embodiment, the inner vessel and/or the outer jacket comprises a composite material. In a more particular embodiment, at least one of the inner vessel or the outer jacket comprises Fiber Reinforced Polymer (FRP) material.

Advantageously, the use of composite materials for the manufacturing of the inner vessel and/or the outer jacket provides the benefits of composite material in terms of material performance, weight saving, material cost, production and industrialization features.

The use of composite materials for the inner vessel and/or outer jacket results in a much lighter double-wall tank compared to tanks using metallic parts.

In a more particular embodiment, at least one of the inner vessel or the outer jacket comprises CFRP material.

In an embodiment, the inner vessel and/or the outer jacket comprises a metallic material.

In a second inventive aspect, the invention provides an aircraft comprising a double-wall tank according to any of the previous claims.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Once the object of the invention has been outlined, specific non-limitative embodiments are described hereinafter.

Figure 1:
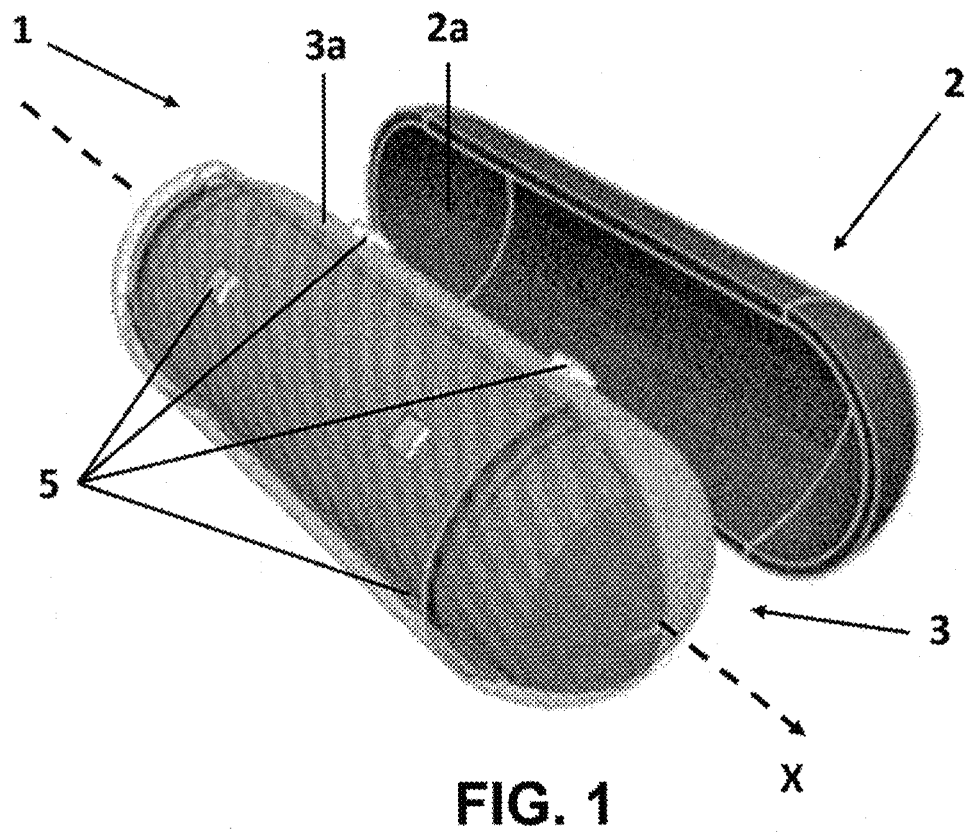
FIG. 1 shows a schematic representation of a double-wall tank according to an embodiment of the present invention.

FIG. 1 shows a schematic representation of a double-wall tank (1) according to an embodiment of the invention. In particular, FIG. 1 shows a double-wall tank (1) comprising an inner vessel (3) defining an inner chamber configured to house a fluid, and an outer jacket (2) defining an outer chamber which houses said inner vessel (3) within.

As can be seen each of the outer jacket (2) and the inner vessel (3) extend along a longitudinal direction (X) and comprise a corresponding central portion provided with a substantially cylindrical shape in this embodiment. Additionally, in this embodiment the outer jacket (2) and the inner vessel (3) comprise two corresponding dome-shaped portions provided at opposite longitudinal ends of the substantially cylindrical central portion. For illustrative purposes, in FIG. 1 the outer jacket (2) is shown separated into two halves divided by a vertical median plane. More in particular, a decoupled half of the outer jacket (2) can be seen separate from the assembly which constitutes, with the exception of said separate outer jacket half, the double-walled tank (1). On the other hand, it can be seen that the half of the outer jacket (2) arranged in service position surrounding the inner vessel (3) has a striped pattern with thick curved lines to highlight the contrast between the outer jacket half and the inner vessel (3).

The double-wall tank (1) further comprises a union assembly provided between the inner vessel (3) and the outer jacket (2). Said union assembly allows to withstand dynamic loads in a more efficient way when compared to rigid elements used as spacers, attached by means of fixed connections to both the outer jacket (2) and the inner vessel (3). Thanks to the elements being part of said union assembly, which are described hereinunder in relation to FIG. 1, there is a continuous and even distribution of loads around the double-wall tank (1), minimizing stress concentrations.

On one hand, said union assembly comprises a polar mount (not shown) arranged between a longitudinal end of the inner vessel (3) according to the longitudinal direction (X) and a corresponding longitudinal end of the outer jacket (2) according to the longitudinal direction (X) (i.e. between the exterior surface of the dome-shaped portion of the inner vessel (3) and the interior surface of the corresponding dome-shaped portion of the outer jacket (2)). Said polar mount acts as a clamped support to withstand inertial loads and moments in any direction.

On the other hand, the union assembly comprises at least three roller bearings (not shown) arranged between an exterior surface (3*a*) of the inner vessel (3) and an interior surface (2*a*) of the outer jacket (2). For illustrative purposes, the location of said bearings is shown by means of white blocks (5) arranged on the exterior surface (3*a*) of the inner vessel (3), occupying a volume or a gap defined between said exterior surface (3*a*) of the inner vessel (3) and the interior surface (2*a*) of the outer jacket (2).

In the particular embodiment shown in FIG. 1, said inner volume between the outer jacket (2) and the inner vessel (3), where the roller bearings are arranged, is kept under vacuum conditions which provide thermal insulation between the inner vessel (3) and the outer jacket (2), nearly eliminating the conduction and convection heat transfer.

A roller bearing is an element that is used to provide low-friction movement for a bushing or bearing block through a contact surface. Said contact surface of the roller bearing, due to the condition of rolling motion that is established between said roller bearing and the surface on which it rolls, has a smaller dimension than the overall dimension of the roller bearing. Although not explicitly depicted in FIG. 1, each of the roller bearings (5) comprises a coupling portion and a rolling portion, and is arranged to withstand radial loads. In particular, each roller bearing (5) is arranged with the coupling portion (5*a*) fixed to the exterior surface (3*a*) of the inner vessel (3) and the rolling portion (5*b*) contacting the interior surface (2*a*) of the outer jacket (2), or with the coupling portion (5*a*) fixed to the interior surface (2*a*) of the outer jacket (2) and the rolling portion (5*b*) contacting the exterior surface (3*a*) of the inner vessel (3).

With regard to the particular distribution of the roller bearings in the embodiment shown in FIG. 1, the white blocks (5) representing the location of said roller bearings are distributed in two different planes perpendicular to the longitudinal direction (X), between the corresponding substantially cylindrical central portions of the outer jacket (2) and the inner vessel (3).

More in particular, in each of said perpendicular planes of the embodiment shown in FIG. 1, there are four roller bearings (two of them being hidden in each section by the lower section of the double-wall tank (1) as shown in FIG. 1), each roller bearing being spaced from each contiguous roller bearing by an arc of substantially 90 degrees about the longitudinal direction (X).

In another embodiment, all the roller bearings are located substantially in a plane perpendicular to the longitudinal direction (X), said plane being located closer to the longitudinal end of the inner vessel (3) opposite to the longitudinal end where the polar mount is arranged than said longitudinal end where the polar mount is arranged.

Preferably, the roller bearings are placed at locations arranged, with respect to the polar mount, at a distance of at least 75% of the maximum length of the double-walled tank (1) along the longitudinal direction.

Figure 2:
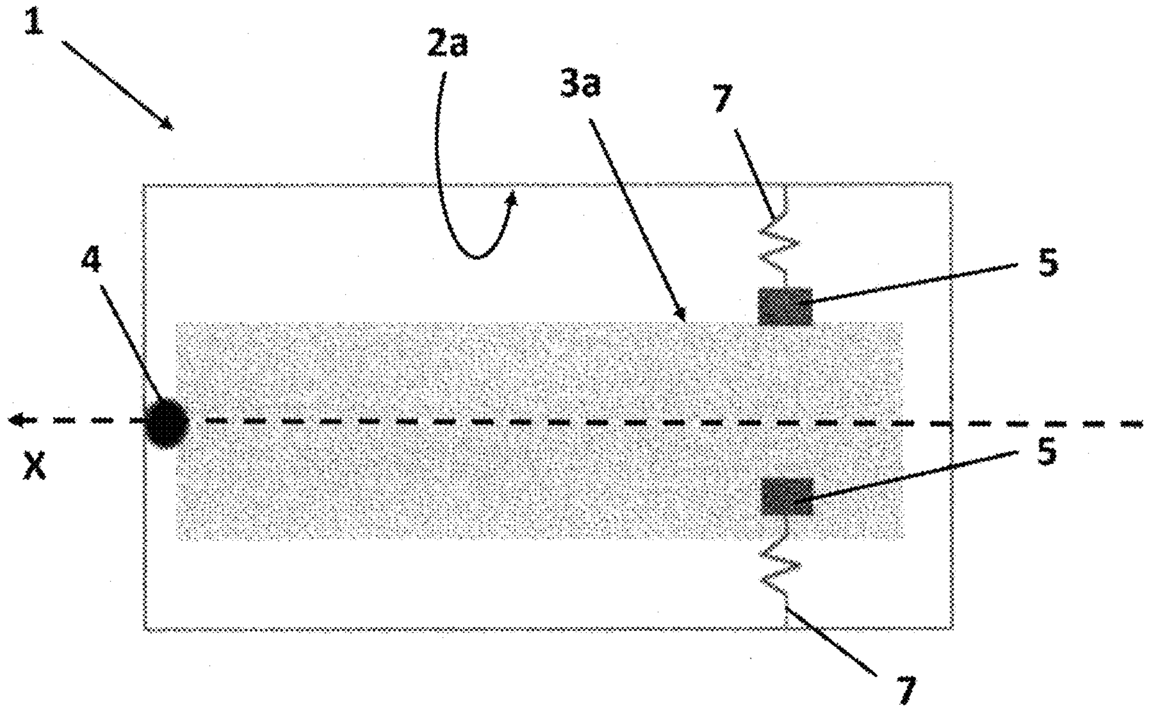
FIG. 2 shows a schematic representation of a lateral cross-section of a double-wall tank, according to an embodiment of the present invention.

FIG. 2 shows a schematic representation of a lateral cross-section of a double-wall tank (1), by means of a plane parallel to its longitudinal direction (X), according to one embodiment of the invention.

As for the union assembly of the double-wall tank (1) shown in FIG. 2, the polar mount (4) is attached to the longitudinal ends of the outer jacket (2) and the inner vessel (3) on the left side of FIG. 2, between the exterior surface (3*a*) of the inner vessel (3) and the interior surface (2*a*) of the outer jacket (2). On the other hand, there are three roller bearings (5) arranged between the exterior surface (3*a*) of the inner vessel (3) and the interior surface (2*a*) of the outer jacket (2). One roller bearing (5) is hidden behind the inner vessel (3) in the figure.

In relation to the roller bearings (5), shown schematically as dark square blocks, they are coupled to the outer jacket (2) and the inner vessel (3) in such a way as to allow absorbing relative displacements in radial direction between both the outer jacket (2) and the inner vessel (3) due to pressure and temperature variations during the operation of the double-wall tank (1).

In this regard, FIG. 2 shows an embodiment in which damping means (7) are arranged to absorb displacements of the roller bearings (5) in a direction perpendicular to the surface (2*a*, 3*a*) to which each roller bearing (5) is fixed. In the particular embodiment shown, where both the central portions of the outer jacket (2) and the inner vessel (3) are substantially cylindrical, the damping means (7) are arranged to absorb displacements of the roller bearings (5) in the radial direction, which is perpendicular to the tangent plane of the surface (2*a*, 3*a*) to which each roller bearing (5) is fixed.

Said damping means (7) are schematically shown as three springs coupled at one end to a corresponding roller bearing (5) and at the other end to the interior surface (2*a*) of the outer jacket (2). For illustrative purposes, both the representation of the damping means (7) as well as the separation between the inner vessel (3) and the outer jacket (2) is enlarged.

Figure 3:
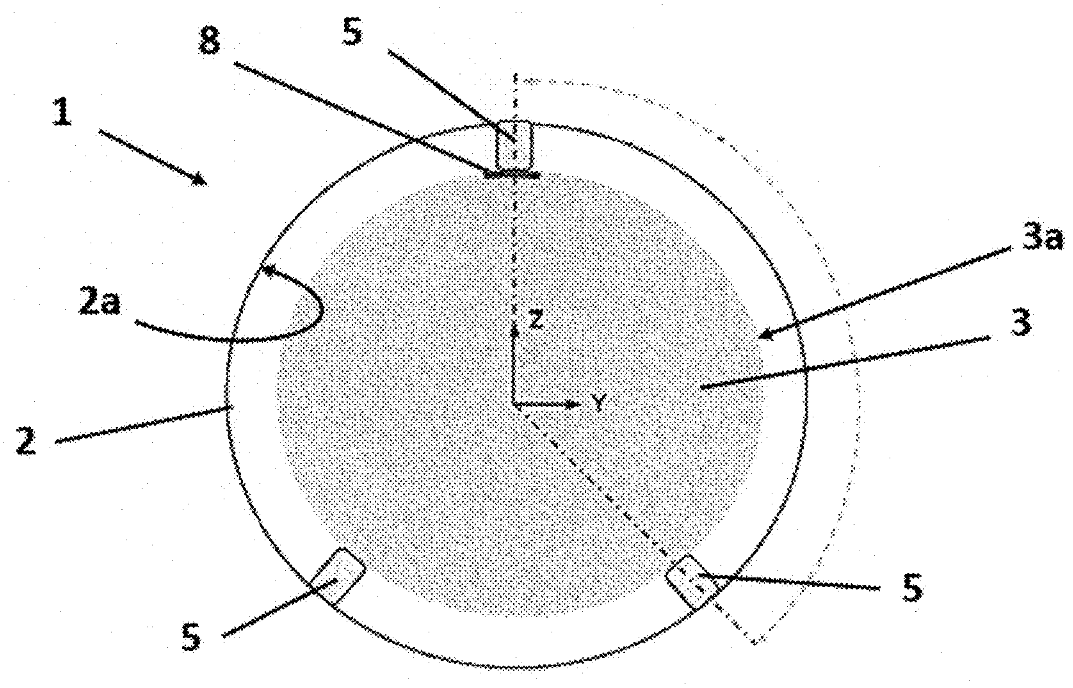
FIG. 3 shows a cross-sectional view through a plane perpendicular to the longitudinal direction along which the outer jacket and the inner vessel extend, according to an embodiment of the present invention.

FIG. 3 shows a cross-sectional view through a plane perpendicular to the longitudinal direction along which the outer jacket (2) and the inner vessel (3) extend, according to an embodiment of the invention.

In particular, FIG. 3 shows a schematic representation of a double-wall tank (1) comprising an inner vessel (3) defining an inner chamber configured to house a fluid, and an outer jacket (2) defining an outer chamber which houses said inner vessel (3) within. As can be seen, the cross-sections of both the outer jacket (2) and the inner vessel (3) have a circumferential shape. Additionally, alike the embodiment shown in FIG. 1, the inner volume between the outer jacket (2) and the inner vessel (3) is kept under vacuum conditions which provide thermal insulation between the inner vessel (3) and the outer jacket (2).

As can be seen, in this embodiment there are three roller bearings (5) arranged between an exterior surface (3*a*) of the inner vessel (3) and an interior surface (2*a*) of the outer jacket (2). Said roller bearings (5) are spaced from each contiguous roller bearing (5) by an arc of substantially 120 degrees about the longitudinal direction.

More particularly, FIG. 3 shows a system of axes, where Y axis is shown as a horizontal axis with a positive direction to the right, Z axis is shown as a vertical axis with a positive direction upwards, and X axis (not explicitly shown) corresponds to the longitudinal direction of the outer jacket (2) and the inner vessel (3), and which is perpendicular to the plane defined by the YZ axes.

Additionally, as can be seen, two of the three bearings (5) are located in the lower half of the cross-section shown, according to the horizontal Y axis, and symmetrically distributed with respect to the vertical Z axis. According to this embodiment, in a case of operation of the double-wall tank (1) in which the Z axis substantially corresponds to the direction of gravity, the presence of two symmetrically distributed bearings (5) in the lower half of the double-wall tank (1) provides a better support of the weight of the inner vessel (3) and its content, and of the inertial loads generated during operation of the double-wall tank (1), providing a better static and dynamic behavior. More in particular, according to an embodiment where the double-wall tank (1) is mounted in an aircraft, the loads that the double-wall tank (1) and, more in particular, the inner vessel (3) has to withstand are due to take-off, accelerations, turbulence and landing of the aircraft.

In the embodiment of FIG. 3, the double-wall tank (1) also comprises a structural reinforcement (8) provided in the exterior surface (3*a*) of the inner vessel (3). More in particular, said structural reinforcement is provided in a region of said exterior surface (3*a*) to which the coupling portion of a roller bearing (5) is fixed, or on which the rolling portion of a roller bearing (5) contacts.

Since the structural reinforcement (8) is arranged on the exterior surface (3*a*) of the inner vessel (3), in a case where the inner vessel (3) is intended for storing fluid in cryogenic conditions, the structural reinforcement (8) is preferably made of a thermally insulating material, thus reducing heat transfer from the outer jacket (2) to the inner vessel (3) through the corresponding roller bearing (5). According to particular embodiments of the invention, said structural reinforcement (8) comprises GFRP. Additionally, at least one structural reinforcement (8) may be coated with a thermal barrier coating (TBC) material.

Figure 4:
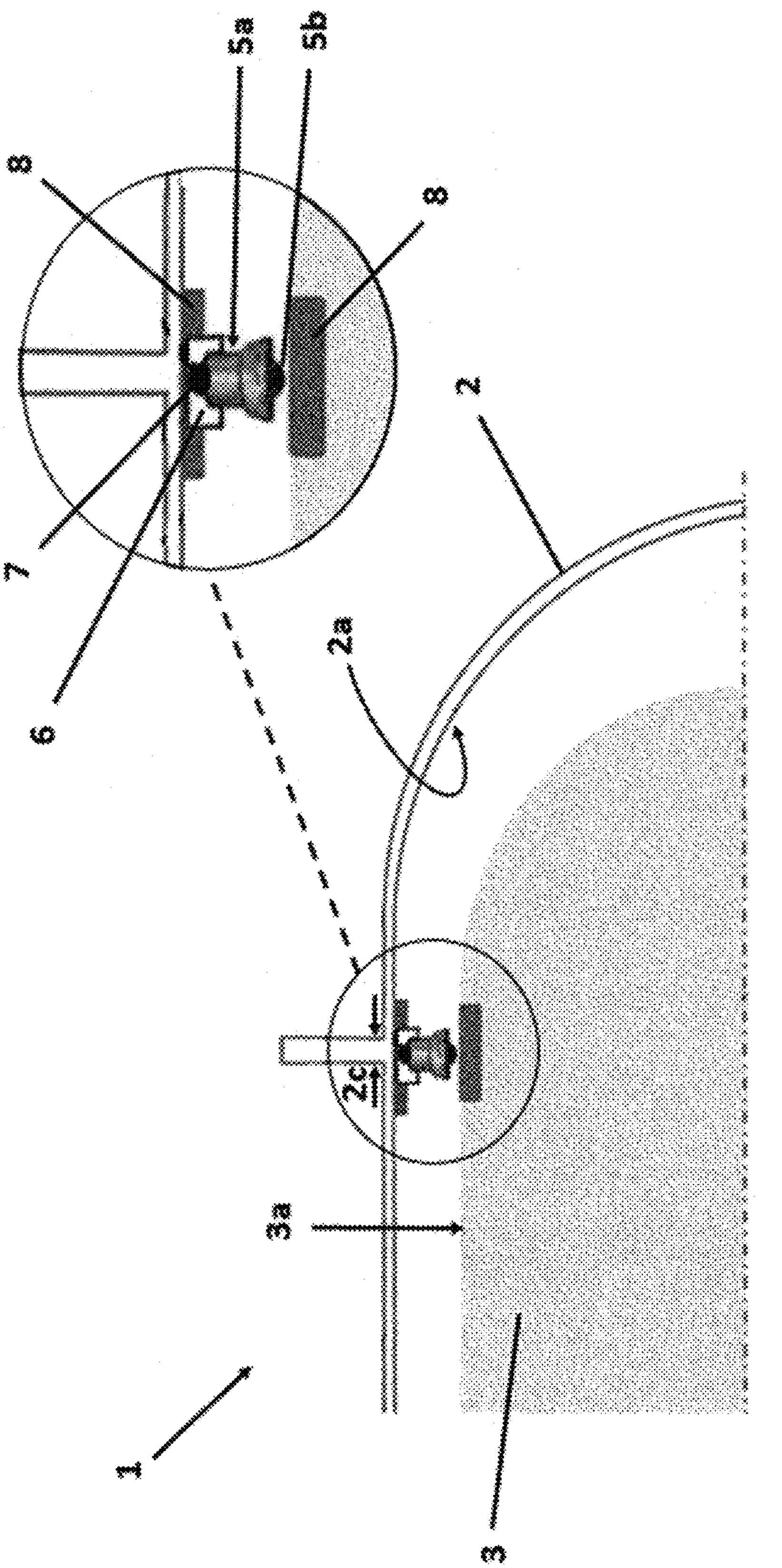
FIG. 4 shows a schematic representation of an arrangement of a roller bearing between the outer jacket and the inner vessel of a double-wall tank according to an embodiment of the present invention.

FIG. 4 shows a schematic representation of an arrangement of a roller bearing (5) between the outer jacket (2) and the inner vessel (3) of a double-wall tank (1) according to an embodiment of the present invention.

In this embodiment, the interior surface (2*a*) of the outer jacket (2) is provided with a housing (6), such that, as can be seen, the coupling portion (5*a*) of the roller bearing (5) is fixed in the housing (6), with the rolling portion (5*b*) contacting the surface (2*a*, 3*a*) opposite the one to which the coupling portion (5*a*) is fixed, that is, the exterior surface (3*a*) of the inner vessel (3).

According to embodiments of the invention, the housing (6) can be provided during the manufacturing process of the corresponding inner vessel (3) or outer jacket (2), by means of a co-curing, bonding or welding process for cases involving thermoplastic-made components, or a co-bonding process for CFRP thermoset-made components. According to more particular embodiments, the housing (6) is made of a thermoplastic material and is welded to at least one thermoplastic portion or laminate provided at the corresponding portion of the inner vessel (3) or the outer jacket (2).

Embedding a roller bearing (5) within such housing (6) contributes to preventing axial and circumferential displacement of the roller bearing (5).

In the embodiment of FIG. 4, the double-wall tank (1) comprises damping means (7) arranged to absorb displacements of the roller bearing (5) due to pressure and temperature variations (i.e., expansions/contractions) during the operation of the double-wall tank (1) in a direction perpendicular to the interior surface (2*a*) of the outer jacket (2) to which the roller bearing (5) is fixed. As can be seen, said damping means (7) are implemented as part of the coupling portion (5*a*) of the roller bearing (5). In the particular embodiment shown, where both the central portions of the outer jacket (2) and the inner vessel (3) are substantially cylindrical, the damping means (7) are arranged to absorb displacements of the roller bearing (5) in the radial direction, which is perpendicular to the tangent plane of the surface (2*a*, 3*a*) to which the roller bearing (5) is fixed.

Also, a structural reinforcement (8) is provided in the exterior surface (3*a*) of the inner vessel (3) in this embodiment. More in particular, said structural reinforcement (8) is provided in the portion of said exterior surface (3*a*) which is arranged as the region on which the rolling portion of the roller bearing (5) contacts. Since the structural reinforcement (8) is arranged on the exterior surface (3*a*) of the inner vessel (3), in a case where the inner vessel (3) is intended to store fluid in cryogenic conditions, the structural reinforcement (8) is preferably made of thermally insulating material. According to particular embodiments of the invention, said structural reinforcement (8) comprises GFRP material. Additionally, at least one structural reinforcement (8) may be coated with a thermal barrier coating (TBC) material.

An additional structural reinforcement (8) is provided in the interior surface (2*a*) of the outer jacket (2) in this embodiment. More in particular, said structural reinforcement (8) is provided in the portion of said interior surface (2*a*) which is arranged as the region to which the coupling portion (5*a*) of the roller bearing (5) is fixed. To prevent damage to the outer jacket (2), the structural reinforcement (8) provided in the interior surface (2*a*) is embodied as a pad.

Finally, the outer jacket (2) shown in FIG. 4 comprises an exterior surface (2*b*) and a first flange (9) extending outwardly from said exterior surface (2*b*) and along a portion of the perimeter of said exterior surface (2*b*) shown according to a plane perpendicular to the longitudinal direction. As can be seen, the first flange (9) is shaped as a rectangular protrusion and has a thickness extending according to the longitudinal direction along a portion (2*c*) of the outer jacket (2). According to embodiments of the invention, the first flange (9) can be provided during the manufacturing process of the outer jacket (2), by means of a co-curing or co-bonding process.

The roller bearing (5) is arranged between the portion (2*c*) of the outer jacket (2) along which the first flange (9) extends and the exterior surface (3*a*) of the inner vessel (3).

The first flange (9) acts as a stiffener in order to facilitate the transfer of loads between the inner vessel (3) and the outer jacket (2) through the roller bearings (5).

Figure 5:
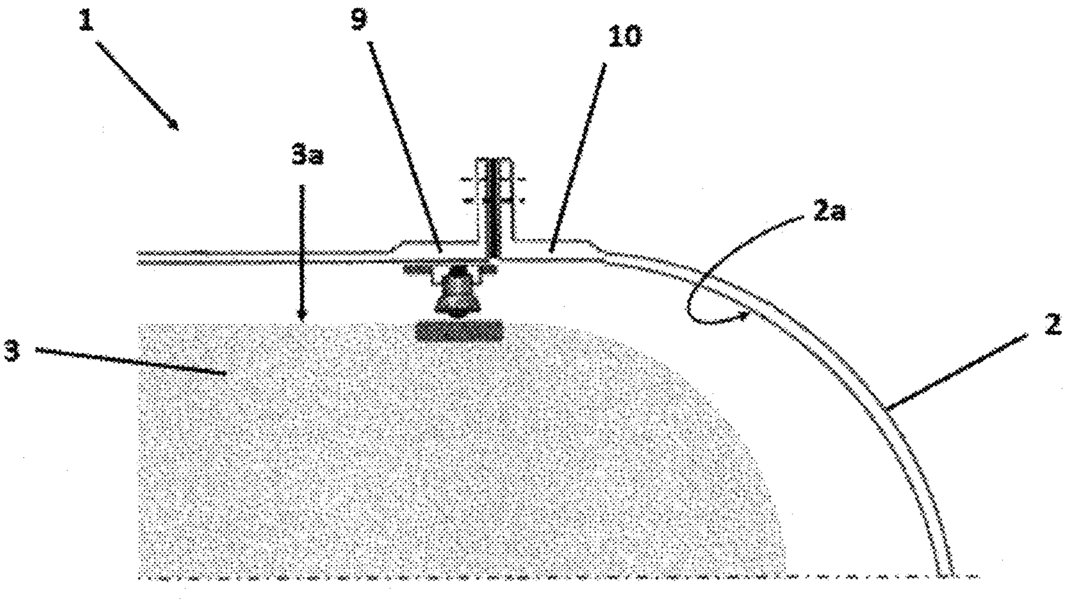
FIG. 5 shows a schematic representation of an arrangement of a roller bearing between the outer jacket and the inner vessel of a double-wall tank according to an embodiment of the present invention.

FIG. 5 shows a schematic representation of an arrangement of a roller bearing between the outer jacket (2) and the inner vessel (3) of a double-wall tank (1) according to an embodiment of the present invention.

FIG. 5 shows a portion of an embodiment of a double-wall tank (1) similar to the embodiment shown in FIG. 4, with a different configuration for the first flange (9) and further comprising a second flange (10) provided on the dome-shaped portion arranged at the longitudinal end of the outer jacket (2).

In particular, the first flange (9) shown in FIG. 5 comprises a reinforced portion adjacent to the rectangular portion protruding perpendicularly to the outer jacket (2). Said reinforced portion is shaped as an overthickness with respect to the outer jacket (2).

The roller bearing (5) is arranged between the portion of the outer jacket (2) along which the reinforced portion of the first flange (9) extends (i.e., along the portion of the outer jacket (2) with increased thickness) and the exterior surface (3*a*) of the inner vessel (3).

The dome-shaped portion provided at the longitudinal end of the outer jacket (2) shown extends from the substantially cylindrical central portion of said outer jacket (2). As can be seen, the first flange (9) is arranged on a location of said substantially cylindrical central portion adjacent to the dome-shaped portion.

The dome-shaped portion of the outer jacket (2), in turn, comprises a second flange (10) extending outwardly from the exterior surface (2*b*), said second flange (10) being arranged on a location adjacent to the first flange (9). The second flange (10) is fixed to the first flange (9).

The second flange (10) shown in FIG. 5 comprises a reinforced portion adjacent to the rectangular portion protruding perpendicularly to the outer jacket (2) and, more in particular, from the dome-shaped portion thereof. Said reinforcing portion is shaped as an overthickness with respect to the outer jacket (2).

Regarding the fixation between the first flange (9) and the second flange (10), FIG. 5 shows two dashed lines crossing both the first (9) and second (10) flanges, perpendicular to their respective wall portions, both dashed lines representing a bolted or riveted connection. Additionally, a black line can be seen between the two wall portions corresponding to each of the first (9) and second (10) flanges. This black line represents sealing means provided at the joint interface between the first (9) and second (10) flanges. Other embodiments of the sealing means comprise at least one selected from a sealant, an O-ring and a gasket, preferably a cryogenic gasket.

Figure 6:
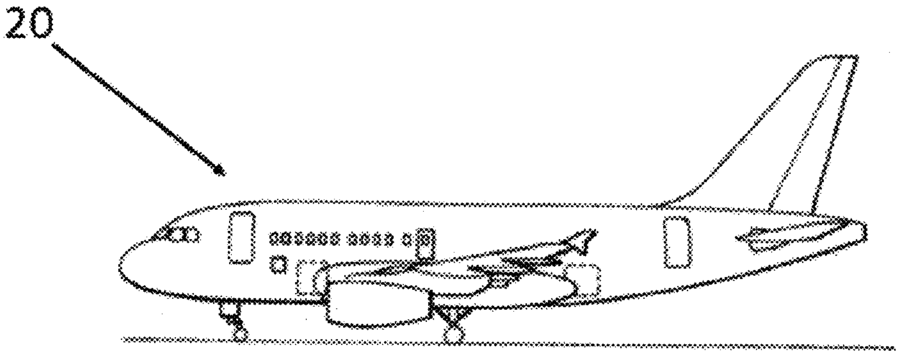
FIG. 6 shows a schematic representation of an aircraft comprising a double-wall tank according to an embodiment of the present invention.

FIG. 6 shows a schematic representation of an aircraft (20) comprising a double-wall tank according to an embodiment of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A double-wall tank comprising:

an inner vessel defining an inner chamber configured to house a fluid, an outer jacket defining an outer chamber which houses said inner vessel, a union assembly provided between the inner vessel and the outer jacket, and a damping means configured to absorb displacements of one of the at least three roller bearings in a direction perpendicular to a surface to which the one of the at least three roller bearings is fixed;

wherein the inner vessel and the outer jacket extend along a longitudinal direction;

wherein the union assembly comprises a polar mount and at least three roller bearings;

wherein the polar mount and the at least three roller bearings are arranged between an exterior surface of the inner vessel and an interior surface of the outer jacket;

wherein the polar mount is arranged at a longitudinal end of the inner vessel according to the longitudinal direction, and wherein each roller bearing comprises a coupling portion a rolling portion and is arranged: with the coupling portion fixed to an exterior surface of the inner vessel and the rolling portion contacting an interior surface of the outer jacket; or, with the coupling portion fixed to the interior surface of the outer jacket and the rolling portion contacting the exterior surface of the inner vessel.

2. The double-wall tank according to claim 1, wherein the outer jacket and the inner vessel each comprise a central portion extending along the longitudinal direction, and wherein the central portion of the outer jacket and the central portion of the inner vessel are each either substantially cylindrical or substantially frustoconical.

3. The double-wall tank according to claim 2, wherein one or more of the at least three roller bearings is arranged between the central portion of the outer jacket and the central portion of the inner vessel.

4. The double-wall tank according to claim 3, wherein the one or more of the at least three roller bearings arranged between the central portions of the outer jacket and the inner vessel are spaced from each contiguous roller bearing by an arc of substantially 360/n degrees according to a circumferential direction about the longitudinal direction, with n being a number of roller bearings arranged between the central portions of the outer jacket and the inner vessel.

5. The double-wall tank according to claim 1, further comprising:

at least one housing provided in the exterior surface of the inner vessel, or the interior surface of the outer jacket, or both, and wherein the coupling portion of one of the at least three roller bearings is fixed in the housing, or the rolling portion of one of the at least three roller bearings is arranged in the housing, or both.

6. The double-wall tank according to claim 1, wherein the exterior surface of the inner vessel, or the interior surface of the outer jacket, or both comprises a structural reinforcement provided in at least one region to which the coupling portion of a roller bearing is fixed, or in at least one region on which the rolling portion of a roller bearing contacts, or both.

7. The double-wall tank according to claim 6, wherein the structural reinforcement comprises a thermally insulating material.

8. The double-wall tank according to claim 1, wherein the outer jacket comprises one dome-shaped portion provided in at least a longitudinal end of the outer jacket according to the longitudinal direction, or the inner vessel comprises one dome-shaped portion provided in at least a longitudinal end of the inner vessel according to the longitudinal direction, or both.

9. The double-wall tank according to claim 1, wherein the outer jacket comprises an exterior surface and a first flange extending outwardly from said exterior surface.

10. The double-wall tank according to claim 9, wherein the outer jacket comprises one dome-shaped portion provided in at least a longitudinal end of the outer jacket according to the longitudinal direction, or the inner vessel comprises one dome-shaped portion provided in at least a longitudinal end of the inner vessel according to the longitudinal direction, or both, wherein the outer jacket and the inner vessel each comprise a central portion extending along the longitudinal direction, and wherein the central portion of the outer jacket and the central portion of the inner vessel are each either substantially cylindrical or substantially frustoconical, and wherein the first flange is arranged on the central portion of the outer jacket, wherein the outer jacket comprises a second flange extending outwardly from the exterior surface, wherein the second flange is arranged on the dome-shaped portion and adjacent to the first flange, and wherein the second flange is fixed to the first flange.

11. The double-wall tank according to claim 10, wherein a joint interface between the first flange and the second flange comprises sealing means.

12. The double-wall tank according to claim 1, wherein at least one of the at least three roller bearings is located in a plane perpendicular to the longitudinal direction different from a plane in which another roller bearing is located.

13. The double-wall tank according to claim 1, wherein the inner vessel, or the outer jacket, or both comprises a composite material or a metallic material.

14. An aircraft comprising:

the double-wall tank according to claim 1.

* * * * *